United States Patent
Naqvi (10) Patent No.: US 8,730,945 B2
(45) Date of Patent: May 20, 2014

(54) SYSTEMS AND METHODS FOR USING A RECIPIENT HANDSET AS A REMOTE SCREEN

(75) Inventor: Shamim A. Naqvi, Boston, MA (US)

(73) Assignee: Aylus Networks, Inc., Westford, MA (US)

( * ) Notice: Subject to any disclaimer, the term of this patent is extended or adjusted under 35 U.S.C. 154(b) by 942 days.

(21) Appl. No.: 12/104,995

(22) Filed: Apr. 17, 2008

(65) Prior Publication Data

US 2008/0274744 A1 Nov. 6, 2008

Related U.S. Application Data (63) Continuation-in-part of application No. 11/504,896, filed on Aug. 16, 2006, which is a continuation-in-part of application No. 11/709,469, filed on Feb. 22, 2007.

(60) Provisional application No. 60/800,688, filed on May 16, 2006, provisional application No. 60/809,029, filed on May 26, 2006, provisional application No. 60/923,930, filed on Apr. 17, 2007.

(51) Int. Cl.
*H04L 12/66* (2006.01)

(52) U.S. Cl.
USPC ........... 370/352; 370/353; 370/354; 370/355; 370/356; 455/428

(58) Field of Classification Search
USPC .......................... 455/428; 370/352–358, 400
See application file for complete search history.

(56) References Cited

U.S. PATENT DOCUMENTS

| | | | |
|---|---|---|---|
| 4,736,407 | A | 4/1988 | Dumas |
| 6,014,706 | A | 1/2000 | Cannon et al. |
| 6,018,662 | A | 1/2000 | Periyalwar et al. |
| 6,032,053 | A | 2/2000 | Schroeder et al. |
| 6,374,112 | B1 | 4/2002 | Widegren et al. |
| 6,574,326 | B1 | 6/2003 | Wong et al. |
| 6,608,832 | B2 | 8/2003 | Forslow |
| 6,694,145 | B2 | 2/2004 | Riikonen et al. |
| 6,782,412 | B2 | 8/2004 | Brophy et al. |
| 6,888,828 | B1 | 5/2005 | Partanen et al. |

(Continued)

FOREIGN PATENT DOCUMENTS

| | | |
|---|---|---|
| EP | 1435748 | 7/2004 |
| EP | 1545129 A1 | 6/2005 |
| WO | WO-2007/010070 A2 | 1/2007 |
| WO | WO-2007/117730 A2 | 10/2007 |

OTHER PUBLICATIONS

Definition of 'proxy' from dictionary.com, http://dictionary.reference.com/browse/proxy, printed Mar. 14, 2009 (5 pages).

(Continued)

*Primary Examiner* — Wayne Cai
(74) *Attorney, Agent, or Firm* — Stuart H. Mayer; Mayer & Williams PC (57) ABSTRACT

The present invention provides systems and methods for using a recipient handset as a remote screen for the initiator handset, while the two handsets are engaged in a voice call. The systems and methods allow a party to transmit its screen buffer to the other party during a voice call between the parties, without allowing the receiving party to store it or forward it to a third party.

14 Claims, 7 Drawing Sheets

(56) References Cited

U.S. PATENT DOCUMENTS

| | | | |
|---|---|---|---|
| 6,950,655 B2 | 9/2005 | Hunkeler et al. | |
| 7,299,049 B2 | 11/2007 | Jagadeesan | |
| 7,301,938 B2 | 11/2007 | Ejzak | |
| 7,353,021 B2 | 4/2008 | Ejzak et al. | |
| 2002/0059416 A1 | 5/2002 | Tuunanen | |
| 2002/0140726 A1 | 10/2002 | Schwartz et al. | |
| 2002/0181462 A1 | 12/2002 | Surdila et al. | |
| 2003/0026245 A1 | 2/2003 | Ejzak | |
| 2003/0027569 A1 | 2/2003 | Ejzak | |
| 2003/0027595 A1 | 2/2003 | Ejzak | |
| 2003/0055974 A1 | 3/2003 | Brophy et al. | |
| 2003/0134636 A1 | 7/2003 | Sundar et al. | |
| 2003/0193426 A1 | 10/2003 | Vidal | |
| 2003/0210683 A1 | 11/2003 | Bais et al. | |
| 2004/0008669 A1 | 1/2004 | Bos et al. | |
| 2004/0019539 A1 | 1/2004 | Raman et al. | |
| 2004/0043766 A1 | 3/2004 | Sashihara | |
| 2004/0043776 A1 | 3/2004 | Tuomela et al. | |
| 2004/0068574 A1 | 4/2004 | Costa Requena et al. | |
| 2004/0076145 A1 | 4/2004 | Kauhanen et al. | |
| 2004/0083195 A1 | 4/2004 | McCord et al. | |
| 2004/0107143 A1 | 6/2004 | Niemi | |
| 2004/0162892 A1 | 8/2004 | Hsu | |
| 2004/0190498 A1 | 9/2004 | Kallio et al. | |
| 2004/0193700 A1 | 9/2004 | Westman et al. | |
| 2004/0193725 A1 | 9/2004 | Costa-Requena et al. | |
| 2004/0205212 A1 | 10/2004 | Huotari et al. | |
| 2004/0219912 A1 | 11/2004 | Johansson et al. | |
| 2004/0240430 A1 | 12/2004 | Lin et al. | |
| 2004/0249887 A1 | 12/2004 | Garcia-Martin et al. | |
| 2004/0249962 A1 | 12/2004 | Lecomte | |
| 2004/0252673 A1 | 12/2004 | Ejzak et al. | |
| 2004/0261116 A1 | 12/2004 | Mckeown et al. | |
| 2005/0021494 A1* | 1/2005 | Wilkinson | 707/1 |
| 2005/0025047 A1 | 2/2005 | Bodin et al. | |
| 2005/0025163 A1 | 2/2005 | Christie | |
| 2005/0043020 A1 | 2/2005 | Lipsanen et al. | |
| 2005/0047399 A1 | 3/2005 | Lee et al. | |
| 2005/0050194 A1 | 3/2005 | Honeisen et al. | |
| 2005/0058125 A1 | 3/2005 | Mutikainen et al. | |
| 2005/0083909 A1 | 4/2005 | Kuusinen et al. | |
| 2005/0089020 A1 | 4/2005 | Ahlback et al. | |
| 2005/0136926 A1 | 6/2005 | Tammi et al. | |
| 2005/0141484 A1 | 6/2005 | Rasanen | |
| 2005/0170861 A1 | 8/2005 | Niemi et al. | |
| 2005/0190772 A1 | 9/2005 | Tsai et al. | |
| 2005/0213606 A1 | 9/2005 | Huang et al. | |
| 2005/0227681 A1 | 10/2005 | Li | |
| 2005/0237933 A1 | 10/2005 | Marjelund et al. | |
| 2005/0243870 A1 | 11/2005 | Balogh et al. | |
| 2005/0245261 A1 | 11/2005 | Ejzak | |
| 2005/0271011 A1 | 12/2005 | Alemany et al. | |
| 2005/0286531 A1 | 12/2005 | Tuohino et al. | |
| 2006/0015812 A1 | 1/2006 | Cunningham et al. | |
| 2006/0025151 A1 | 2/2006 | Karaoguz et al. | |
| 2006/0031888 A1 | 2/2006 | Sparrell | |
| 2006/0062206 A1 | 3/2006 | Krishnaswamy | |
| 2006/0083199 A1 | 4/2006 | Yang | |
| 2006/0089143 A1 | 4/2006 | Jagadeesan | |
| 2006/0104262 A1 | 5/2006 | Kant et al. | |
| 2006/0114987 A1 | 6/2006 | Roman | |
| 2006/0120287 A1 | 6/2006 | Foti et al. | |
| 2006/0121902 A1 | 6/2006 | Jagadeesan et al. | |
| 2006/0136557 A1 | 6/2006 | Schaedler et al. | |
| 2006/0140150 A1 | 6/2006 | Olvera-Hernandez et al. | |
| 2006/0155814 A1 | 7/2006 | Bennett et al. | |
| 2006/0161512 A1 | 7/2006 | Schaedler et al. | |
| 2006/0164550 A1 | 7/2006 | Yoshimoto et al. | |
| 2006/0183478 A1 | 8/2006 | Jagadeesan et al. | |
| 2006/0209768 A1 | 9/2006 | Yan et al. | |
| 2006/0221903 A1 | 10/2006 | Kauranen et al. | |
| 2006/0246903 A1 | 11/2006 | Kong et al. | |
| 2006/0256751 A1 | 11/2006 | Jagadeesan et al. | |
| 2006/0258394 A1 | 11/2006 | Dhillon et al. | |
| 2006/0262806 A1 | 11/2006 | Bouazizi | |
| 2006/0291412 A1 | 12/2006 | Naqvi et al. | |
| 2006/0291419 A1 | 12/2006 | McConnell et al. | |
| 2006/0291437 A1 | 12/2006 | Naqvi et al. | |
| 2006/0291484 A1 | 12/2006 | Naqvi et al. | |
| 2006/0291488 A1 | 12/2006 | Naqvi et al. | |
| 2006/0291489 A1 | 12/2006 | Naqvi et al. | |
| 2006/0294244 A1 | 12/2006 | Naqvi et al. | |
| 2006/1029148 | 12/2006 | Naqvi et al. | |
| 2007/0002902 A1* | 1/2007 | Hannuksela | 370/503 |
| 2007/0008913 A1 | 1/2007 | Naqvi et al. | |
| 2007/0008951 A1 | 1/2007 | Naqvi et al. | |
| 2007/0014281 A1 | 1/2007 | Kant | |
| 2007/0033286 A1 | 2/2007 | Min | |
| 2007/0053343 A1 | 3/2007 | Suotula et al. | |
| 2007/0066347 A1 | 3/2007 | Silverbrook et al. | |
| 2007/0067807 A1 | 3/2007 | O'Neil | |
| 2007/0091855 A1 | 4/2007 | Karaoguz et al. | |
| 2007/0110043 A1 | 5/2007 | Girard | |
| 2007/0111752 A1 | 5/2007 | Pazhyannur | |
| 2007/0155310 A1* | 7/2007 | Borcic et al. | 455/3.06 |
| 2007/0165572 A1 | 7/2007 | Lenzarini | |
| 2007/0174471 A1* | 7/2007 | Van Rossum | 709/229 |
| 2007/0197227 A1 | 8/2007 | Naqvi et al. | |
| 2007/0207782 A1* | 9/2007 | Tran | 455/414.1 |
| 2007/0207802 A1 | 9/2007 | Palmer et al. | |
| 2007/0207804 A1 | 9/2007 | Sharma et al. | |
| 2007/0217349 A1 | 9/2007 | Fodor et al. | |
| 2007/0217366 A1 | 9/2007 | Sagi et al. | |
| 2007/0226244 A1 | 9/2007 | Sparrell et al. | |
| 2008/0043717 A1 | 2/2008 | Bellora et al. | |
| 2008/0130637 A1 | 6/2008 | Kant et al. | |
| 2008/0316998 A1 | 12/2008 | Procopio et al. | |

OTHER PUBLICATIONS

European Search Report for European Patent Application No. EP08746133 mailed Jun. 25, 2010. 8 pages.

GSM Association: "Video Share Service Definition 2.0." Mar. 27, 2007. XP002585831. http://www.gsmworld.com/documents/se41.pdf>. Retrieved on Jun. 2, 2010. 28 pages.

International Search Report and Written Opinion, International Application No. PCT/US08/60656, Aylus Networks, Inc., Jul. 2, 2008, 8 pages.

International Search Report for Application No. PCT/US08/57367, Aylus Networks, Inc., Aug. 8, 2008, 7 pages.

International Search Report, International Application No. PCT/US 06/24619, date mailed Feb. 14, 2007, 2 pages.

International Search Report, International Application No. PCT/US 06/24624, mailed Apr. 3, 2007, 1 page.

Nokia Corporation: "Video Sharing, Enrich Your Voice Call with Video." Nov. 1, 2004. XP002336424, 12 pages.

OSGi Service Platform. Mar. 2003, The Open Services Gateway Initiative, Release 3. pp. 345-346, 505, 513-526 (602 pages).

International Search Report and Written Opinion, International Patent Application No. PCT/US08/60644, Aylus Networks, Inc., Jun. 27, 2008 (9 pages).

* cited by examiner

SYSTEMS AND METHODS FOR USING A RECIPIENT HANDSET AS A REMOTE SCREEN

CROSS-REFERENCE TO RELATED APPLICATIONS

This application claims priority under 35 U.S.C. §119(e) to U.S. Provisional Patent Application No. 60/923,930, entitled "Systems and Methods for Preserving Digital Rights and Personal Content in Combinational Services," filed Apr. 17, 2007; and claims priority under 35 U.S.C. §120 as a continuation-in-part of U.S. patent application Ser. No. 11/709,469, filed Feb. 22, 2007, entitled Systems and methods for enabling IP signaling in wireless networks; and claims priority under 35 U.S.C. §120 as a continuation-in-part of U.S. patent application Ser. No. 11/504,896 (U.S. Patent Pub. No. 2007/0197227), filed Aug. 16, 2006, entitled System and Method for Enabling Combinational Services in Wireless Networks By Using a Service Delivery Platform, (which in turn claims priority under 35 U.S.C. §119(e) to U.S. Provisional Patent Application No. 60/800,688, filed May 16, 2006, entitled System and Method for Supporting Combinational Services Without Simultaneous Packet and Circuit Connections and to U.S. Provisional Patent Application No. 60/809,029, filed May 26, 2006, entitled System and Method for Supporting Combinational Services Without Simultaneous Packet and Circuit Connections), the disclosures of each of the above are incorporated herein by reference in their entirety.

BACKGROUND

1. Field of the Invention

This invention generally relates to wireless networks and to IP Multimedia Subsystem (IMS) networks, and more specifically to systems and methods for using a recipient handset as a remote screen.

2. Description of Related Art

Current wireless networks support circuit-switched (CS) and packet-switched (PS) connections. In some wireless networks, both types of connections may exist contemporaneously and be available to mobile handsets or user endpoints (UEs). In other wireless networks, a mobile handset may have access to either a CS connection or a PS connection but not both at the same time.

CS and PS networks will now be described in greater detail. In a CS network such as PLMN, users' network mobile handsets are connected to Base Transceiver Stations (BTS) through a radio access network. The BTS in turn are connected to a plurality of Base Station Servers (BSC) that in turn are connected to a network of Mobile Switching Centers (MSC). The MSC provide wireless services to the users' handsets, and are also inter-connected with the Public Switched Telephone network (PSTN). This arrangement makes it possible for voice traffic to be carried between mobile handsets and landline telephone sets. The MSC in a wireless network effectively behaves as a switch that supports the mobility and roaming functions of a user's handset.

When a user's handset requests a telephone call or a service, such as voice mail, a prepaid call, or a toll-free call, it generates a "call event" at the MSC. Each call event can potentially "trigger" one or more Trigger Detection Points (TDP) in the MSC. When a call event triggers a particular TDP, the MSC sends a pre-specified message to a Service Control Function (SCF). The message includes, for example, the phone numbers of the calling and called parties, and the nature of the service request. The SCF then "fields" the message, i.e., service logic within the SCF responds appropriately to the message. In WIN/CAMEL implementations, the MSC and SCF communicate using standards-based protocols such as Transaction Capabilities Application Part (TCAP) from the family of protocols commonly referred to as Signaling System 7 (SS7).

For example, consider a "call origination" call event that happens when a user makes a new call request at the MSC. This call event triggers a corresponding TDP, causing the MSC to send a message with event-related information to the SCF, e.g., the calling and called numbers. The SCF then processes the message, e.g., by querying an internal or external database to verify that the calling party is authorized to initiate telephone calls. The SCF then responds back to the MSC with a message that indicates whether the call is "allowed" or "denied."

In a PS network, services are generally supported by IP Multimedia Subsystem (IMS). The IMS architecture manages the network with several control functions, i.e., functional entities. The Breakout Gateway Control Function (BGCF) is an inter-working function that handles legacy circuit-switched traffic. A new function called the Media Gateway Control Function (MGCF) controls the Media Gateway (MGW). The Media Resource Function Processor (MRFP), which is controlled by the Media Resource Control Function (MRFC), performs media processing functions. An IMS session is controlled by a logical function called the Call State Control Function (CSCF). It is logically partitioned into three functional entities, the Proxy, Interrogating and Serving CSCFs. The Proxy Call State Control Function (P-CSCF) is the first contact point for a user's handset. The Interrogating CSCF (I-CSCF) is mainly the contact point within an operator's network for all IMS connections destined to a subscriber of that network operator, or a roaming subscriber currently located within that network operator's service area. The Serving CSCF (S-CSCF) actually handles the session states in the network. "Third party" application servers (AS) provide services to the mobile handset, such as voice mail, via the S-CSCF. The IMS controls packet services among the different functional entities with signaling protocols such as Session Initiation Protocol (SIP), which is an IP-based signaling protocol designed for multimedia communications.

When a mobile handset first powers on, logic residing in the handset initiates a "registration" procedure with the IMS core, first by requesting the radio access network to assign it an IP address. After it receives an IP address, the mobile handset attempts to register as an IP-enabled endpoint with the IMS core, by sending a "register" request to the P-CSCF. Assuming that the handset is registering from a visiting domain, the P-CSCF then uses a Domain Name Server (DNS) to search for the handset's home domain S-CSCF. Once the P-CSCF locates the S-CSCF for the mobile handset, it passes the "register" request to that S-CSCF. The S-CSCF contacts the Home Subscriber Subsystem (HSS), which looks up the mobile handset's profile. This profile contains assorted information about the user, and what services the handset is authorized to use. A logical function in the S-CSCF called the "registrar" then authenticates the mobile handset, e.g., verifies that the handset is legitimate.

The S-CSCF also loads Service Point Triggers (SPT) from the handset's profile. The SPT define the appropriate action for the S-CSCF to take when the handset or an AS requests a transaction. For example, if the handset requests voice mail service, the SPT triggers the S-CSCF to provide the addresses of the voice mail AS for the handset. So long as the handset is powered on, the SPT for that handset are loaded into the S-CSCF, so a service request fires the appropriate trigger in the S-CSCF. The SPT are analogous to the above-described TDP in the CS network. The SPT and TDP both trigger an appropriate response from a controlling server, e.g., the MSC or S-CSCF. However, the TDP are more generally applicable to call requests and call related events such as dialed number, etc., and are not particular to the user's profile. The SPT are specific to the mobile handset, and are stored in the user's profile in the HSS and loaded into the S-CSCF when the handset registers.

If an entity wishes to engage in a transaction with the mobile handset, e.g., to send a message to the handset, the entity utilizes an AS to send a request for the transaction to the S-CSCF. This triggers an SPT in the S-CSCF, which recognizes the request as pertaining to a registered handset and sends the appropriate information to the handset. Other ASs may not know which S-CSCF to contact in order to engage in a transaction with a particular handset. In this case, the AS interrogate a Subscriber Location Function (SLF), which provides information about a handset's S-CSCF to the AS, which then contacts that S-CSCF as described above. If the handset wishes to request a service, it sends the request to the S-CSCF, e.g., using a SIP invite. This triggers an SPT in the S-CSCF, which then directs the service request to a particular Application Server (AS), which then provides the service to the handset. For example, if the user wants to initiate an IMS call, it sends a SIP invite message to the S-CSCF, which may then contact the AS responsible for IMS calls, called the Back-to-Back User Agent (B2BUA), which initiates the IMS call flow.

SUMMARY

The present invention provides systems and methods for using a recipient handset as a remote screen for the initiator handset, while the two handsets are engaged in a voice call. The systems and methods allow a party to transmit its screen buffer to another party during a voice call between the parties. The receiving handset cannot store the received screen buffer or forward it to a third party.

In one aspect, the invention provides a method for utilizing a recipient handset as a remote screen for an initiator handset during a voice call between the initiator handset and the recipient handset carried over a circuit-switched (CS) network, wherein both handsets are on a wireless network utilizing multiple Radio Access Bearer (mRAB) technology, the method comprising: a personal agent (PA) on an initiator handset negotiating display capabilities with a PA on a recipient handset via a serving node (SN) residing on a packet-switched (PS) network; the PA on the initiator handset capturing the initiator handset's screen buffer and transmitting it to the SN; the SN forwarding the screen buffer to a PA on the recipient handset; the PA on the recipient handset receiving the screen buffer from the SN and storing it in the screen buffer of the recipient handset; and the recipient handset rendering the received screen buffer, wherein the recipient handset is unable to store or make a copy of the screen buffer.

Optionally, the SN can convert the received screen buffer to a format capable of being rendered by the recipient handset prior to forwarding the screen buffer to the PA on the recipient handset. In some instances, rendering of the received screen buffer is initiated on the recipient handset before the entire screen buffer has been received. Rendering of the screen buffer on the initiator handset and on the recipient handset can be coordinated. The PA on the recipient handset can capture the screen buffer of the recipient handset and send it to the SN at a predetermined rate.

In some embodiments, the initiator handset's screen buffer contains a representation of a media object residing on the initiator handset. The media object can be a video clip, a digital image, a SMS, a MMS, an IM message or an E-mail message. The media object can have an audio component, which is transmitted to the recipient handset over the CS network or over the PS network.

The initiator handset can comprise a media player (MP), which resides on the initiator handset, and sends a representation of the media object to a renderer logic residing on the initiator handset. The renderer logic can generate the screen buffer to be transmitted.

DETAILED DESCRIPTION

The present invention allows an initiating party, engaged in voice call with a recipient party, to use the recipient party's handset as a remote screen for display of the content being displayed on the initiating party's handset without the recipient party's handset being able to store or forward such content.

Embodiments of the present invention allow subscribers, while engaged in a voice call with another party, to show objects residing on their handset to the other party without the other party being in possession of or receiving a copy of the object. This can be understood as the party having the object on its handset adding a remote screen to its handset, the remote screen being the other party's handset. In one example, such an exchange allows a party to show an object to the other party, while the parties are engaged in a voice call, without violating any digital rights that may be attached to the object in question. In addition, such exchange allows a party to show a message (e.g., a personal or sensitive E-mail or SMS) to the other party without forwarding the message to the other party. Thus the other party is not in possession of the message and cannot store it or forward it to a third party. In particular, embodiments of the invention allow a multimedia object to be rendered, i.e., displayed and played on the audio/video outputs of the receiving party handset, without allowing the receiving party to store, copy or preserve for later use the object itself. It is assumed that the party, i.e., first party, initiating the rendering of the multimedia object has the right to render the object in question for personal use. The present application assumes that rendering such an object for a second party, without allowing said party to store, copy or preserve for later use, does not violate any rights. An example in this context is that the first party has the right to render the object for himself, and if during such a rendering the second party views and/or listens to said object, this act does not constitute a violation of digital rights. A colloquial expression would be that the second party "looks over the shoulder" of the first party. Indeed, it can be argued that such a method and system would act as a stimulant for the second party to purchase said object.

Uses of Multimedia Objects in Combinational Services

Recent developments in wireless services have concentrated on so-called Combinational Services that make use of simultaneous CS and PS connections. In most variants of such services the CS connection is used to carry voice between the calling and called parties, whereas the PS connection is used to carry multimedia data (live video, video clips, music videos, audio clips, images, etc.) between the same two parties. Other names used for such services include but are not limited to Video Share, See What I See, etc., some of which are described in greater detail in the incorporated patent references. Standards bodies such as 3GPP and associations such as GSM have announced standard's activities and Inter-operability trials involving such services.

Combinational services are gaining popularity amongst wireless operators worldwide and several such operators have expressed interest in offering such services to their subscribers. It has been estimated that 900 million handsets will be capable of receiving simultaneous CS and PS connections by the year 2011, i.e., will be capable of supporting combinational services. More than 50% of handsets manufactured today contain cameras and other appurtenances for supporting the rendering of multimedia objects. As has been stated before a combinational service, as envisioned by 3GPP, uses the CS connection for carrying voice and uses the PS connection for carrying the multimedia objects, simultaneously. Often cited examples of combinational services are as follows:

1. Transmitting of (high-resolution) images from one party to another while conversing; the transmitted image is then rendered on the receiving party handset by service logic local to said handset;
2. Transmitting and subsequent rendering of music video and video clips from sending handset to receiving handset;
3. Transmitting and subsequent rendering of audio clips and files from sending handset to receiving handset;
4. Transmitting of live video captured by equipment on sending handset to a receiving handset and subsequent rendering of such video on the A/V output equipment of the receiving handset.

Since different wireless networks depend on a variety of different technologies whose capabilities to support CS and PS connections vary widely, different systems and methods may be needed for different wireless technologies so that the coordination is reasonably accurate and no extraneous delay or "lag" is introduced to voice or data transfer.

We begin by describing IP signaling in mobile devices and how IP connectivity can be re-established if handset becomes not IP-accessible. We then describe how a CS network can be used to initiate connection to the PS network using a service delivery platform (SDP). We then focus our attention on the Serving Node (SN) and the personal agent (PA) components of the SDP. Finally, we describe the details of the system and methods for preserving digital rights and personal content in combinational services.

IP Signaling in Mobile Devices

As is known to persons skilled in the art, in some circumstances a network operator may disconnect a mobile handset from a packet-switched (PS) network by withdrawing its IP address. For example, if a first mobile handset registers to the IMS network, thus obtaining an IP address, but then does not use its IMS connection for a specified period of time, the network may withdraw its IP address and assign that address to a second mobile handset. In this case, the first handset is disconnected from the IMS network, and thus no longer IP accessible until it re-registers to the IMS network. When a handset loses its IP address and is disconnected from the IMS network, it can no longer participate in IP-based services. Systems and methods described below allow another entity, such as another handset or a network entity, to send an IP-based message to a handset that lacks an IP address, in effect "waking up" the handset and causing it to initiate its own request for an IP address, so that it can receive the IP-based message.

Uses of IP Signaling in Mobile Services

As an example of an IP service that would benefit from user-to-user (handset-to-handset) IP signaling, consider the case in which party A wishes to place a voice call to party B, and to transmit a photograph as part of "call alerting." It is expected that party B will receive the call alert (indicated by "ringing") and the photograph synchronously, e.g., party B may use the photograph to identify the calling party. In order to transmit the image to party B, party A's handset needs to establish a packet connection to party B's handset and negotiate resources and capabilities. However, if party B's handset is disconnected from the IMS network, party A's handset cannot send the photograph to party B's handset. Further details on this kind of interaction may be found in U.S. patent application Ser. No. 11/709,469, filed Feb. 22, 2007, the entire contents of which are incorporated herein by reference.

As an example of an IP service that would benefit from network-to-user (network-to-handset) IP signaling, consider the case in which a network server wishes to transmit a multimedia object to a mobile handset. In order to begin transmitting the object, the server needs to know the capabilities of the handset. If the handset is not IP accessible, the network server may not reach the handset to begin resource negotiation or to transmit the object.

Conditions Under which Handsets May not be IP-Accessible

Figure 3:
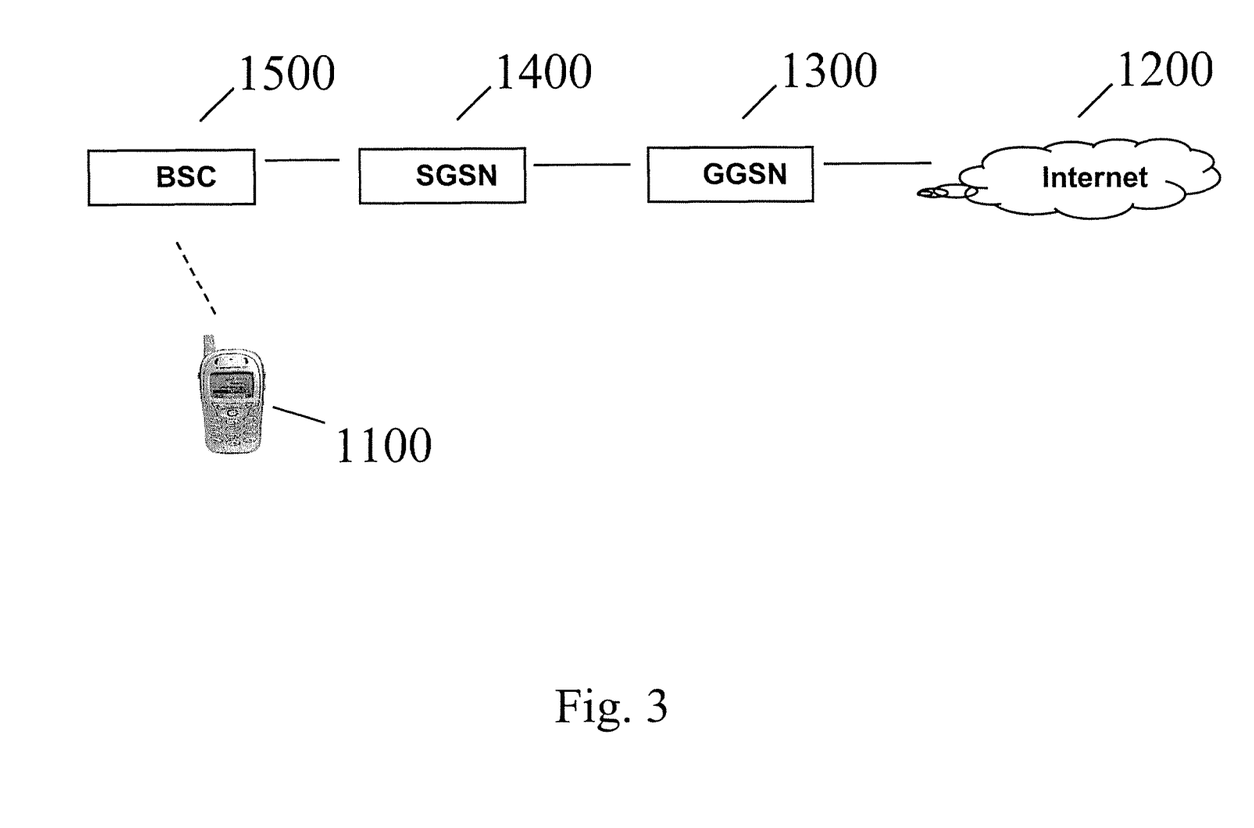
FIG. 3 illustrates a GSM/GPRS packet-switched network architecture.

FIG. 3 depicts components in a GSM/GPRS packet-switched (PS) network, and their communication pathways to an IP network, e.g., the Internet 1200, and to handset 1100. The GSM/GPRS network includes one or more Base Station Servers (BSC) 1500, which are in communication with handset 1100, Serving Gateway Support Node (SGSN) 1400, and GPRS Gateway Support Node (GGSN) 1300, which is in communication with Internet 1200. GGSN 1300 and SGSN 1400 work collaboratively to assign an IP address from Internet 1200 to mobile handset 1100. Specifically, GGSN 1300 communicates with Internet 1200, and allocates IP addresses for user handsets, e.g., handset 1100. SGSN 1400 communicates with GGSN 1300 and with base station server (BSC) 1500 to provide a wireless connection between handset 1100 and Internet 1200. When this is accomplished, it is said that mobile handset 1100 has a Packet Data Protocol (PDP) context.

Most network operators implement a policy that de-establishes the PDP context of a mobile handset when it is not used. Such de-commissioning is typically implemented within a time period of a few minutes. When the handset loses its PDP context, it does not have an IP address assigned to it and is not reachable by IP-based addressing schemes. At some time in the future, the handset may initiate a data request, causing a new PDP context to be established for this handset, including obtaining a new IP address to the handset. In other words, if a handset lacking an IP address requests an IP connection, then it can initiate that connection, but if another entity requests an IP connection with a handset lacking an IP address, the entity cannot itself establish that connection. It is possible for a network operator to assign a "static" IP address to a mobile handset, so that it will remain connected to the IP network, but this is atypical because IP addresses are a valuable resource in short supply.

Figure 4:
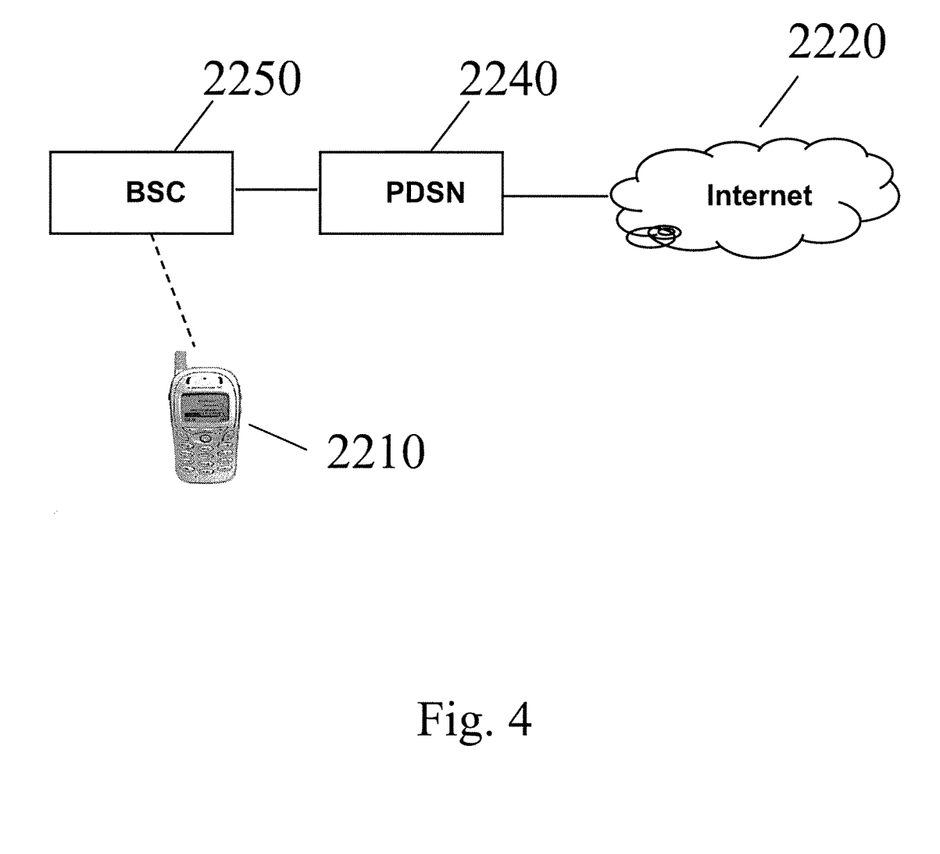
FIG. 4 illustrates a CDMA circuit-switched network architecture.

FIG. 4 depicts components in a CDMA circuit-switched (CS) network, and their communication pathways to an IP network, e.g., Internet 2220, and to mobile handset 2210. The CDMA network includes one or more Base Station Servers (BSC) 2250, which are in communication with handset 2210, and Packet Data Serving Node (PDSN) 2240, which is in communication with Internet 2220. A Point-to-Point protocol (PPP) session exists between the mobile handset 2210 and PDSN 2240. PDSN 2240 acts as a connection point between BSC 2250 and an IP network, e.g., Internet 2220, by assigning handset 2210 an IP address from Internet 2220 and providing access to the Internet 2220. As practitioners skilled in the art know, the PPP session may be maintained even if the handset goes "dormant," so the handset will remain IP-accessible. An incoming packet for a dormant mobile handset then waits at the packet control function (PCF) upon a "mobile origination" message from the handset in response to overhead messages generated collaboratively by the PCF and the BSC. However, network operators in such networks typically choose to de-allocate IP addresses and tear down the PPP session in order to conserve IP addresses, if the mobile handset does not use its PPP session for a specified period of time. If the mobile handset 2210 does not have a PPP session, other entities cannot contact it via the IP network.

Even if a mobile handset is not IP-accessible, e.g., because the GSM/GPRS or CDMA network has de-allocated its IP address, it still has a connection to the circuit-switched (CS) network; as described above, the CS connection can be used to initiate and receive voice calls, SMS and other circuit-switched services.

Systems and Methods for Initiating IP Connectivity to Handsets Lacking IP Addresses If a mobile handset lacks an IP address and so cannot be directly contacted by another entity, the handset's existing CS connection can be exploited to cause the handset to initiate its own connection to the PS network. Specifically, a specified message, or "trigger," is sent to the handset via the CS network, instructing logic residing on the handset to initiate a connection to the PS network.

One system that can facilitate this interaction is the Service Delivery Platform (SDP) described in detail in U.S. Patent Pub. No. 2007/0197227, which is incorporated herein by reference in its entirety. Descriptions of other systems and/or components may be found in the incorporated patent references, given below. An overview of the service delivery platform is provided below.

Overview of Service Delivery Platform

Briefly, the SDP includes a Serving Node (SN) that may communicate with both the CS voice network and the packet-switched network (with or without IMS). The SDP also includes a Personal Agent (PA), which is a piece of service logic that resides in the mobile handset(s). The PA and the SN can send messages to each other, e.g., regarding services the user would like to use, the local network environment of the handset, or instructions the SN would like the PA to execute on the handset.

The service delivery platform includes a Serving Node (SN) that supports combinational services by communicating with both the circuit-switched voice network and the packet-based IMS network. In particular, the SN is simultaneously aware of the states of the Service Control Function (SCF) services of a voice call between User Endpoints (UE), and of the registration states of UEs involved in a packet session. The service delivery platform also includes a Personal Agent (PA), which is a piece of service logic that resides in the UEs. The PA sends messages to the SN regarding services that the user would like to use, and also regarding its local network environment. The SN then responds appropriately by making appropriate voice network and/or IMS network services available to the user. Thus, the service delivery platform has one "eye" on the circuit-switched voice network and another "eye" on the IMS network, allowing it to deliver combinational services to users without needing to upgrade the existing network to 3G.

Figure 5:
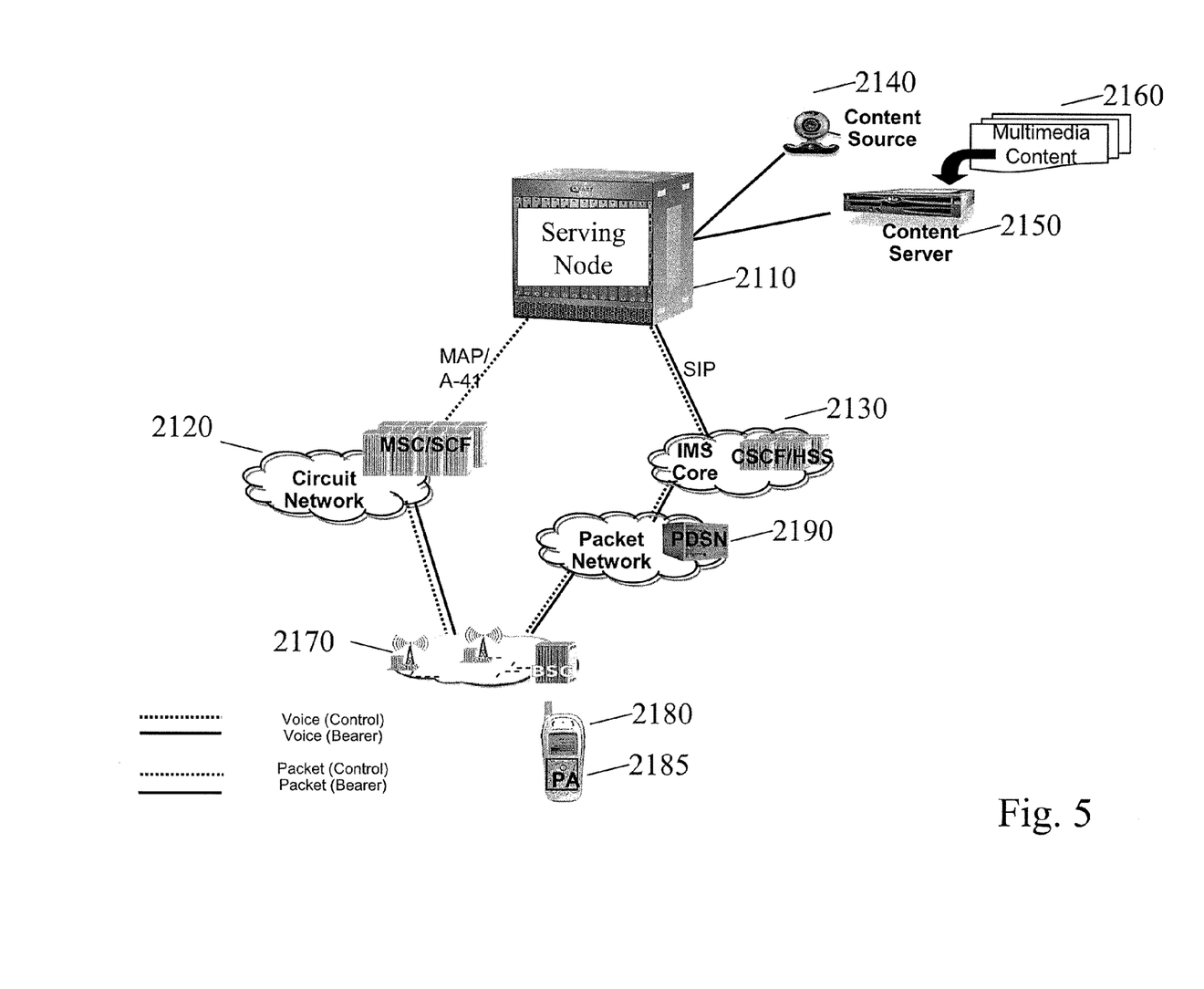
FIG. 5 illustrates an overview of the service delivery platform (SDP) and its connections to the circuit-switched (CS) and packet-switched (PS) networks.

FIG. 5 is an overview of the service delivery platform and its connections to the circuit-switched and packet-switched networks. The service delivery platform includes SN 2110 and PA 2185, which resides on UE 2180. As discussed in greater detail below, SN 2110 and PA 2185 communicate with each other via the existing circuit-switched and packet-switched network infrastructures in order to provide combinational services to the user.

The existing "2G" infrastructure includes radio access network 2170, circuit-switched (CS) network 2120, packet-switched (PS) network 2190, and IMS core 2130. As described above, CS network 2120 includes Mobile Switching Center(s) (MSC) that provides wireless voice services to UE 2180 over radio access network 2170. PS network 2190 includes Packet Data Serving Node(s) (PDSN) that act as the connection point between radio access network 2170 and IMS core 2130. IMS core 2130 includes CSCF(s) and HSS(s) that provide multimedia services to UE 2180 via PS network 2190 and radio access network 2170. However, as noted above, even if UE 2180 is capable of processing signals from either network, i.e., can process a voice call or a multimedia session, radio access network 2170 cannot support simultaneous connections between UE 2180, CS network 2120, and PS network 2190. In other words, CS network 2120, PS network 2190, and radio access network 2170 are not, by themselves, capable of providing combinational services to UE 2180.

The service delivery platform provides combinational services to UE 2180 as follows. SN 2110 communicates both with CS network 2120 and with IMS core 2130, and appears like a normal system component to each of the two networks.

In CS network 2120, normally when UE 2180 requests a voice call or other service on CS network 2120, the request triggers a Trigger Detection Point (TDP) at the MSC, and the MSC then sends a pre-specified message to a Service Control Function (SCF) that responds appropriately. The message includes, for example, the phone numbers of the calling and called parties, and the nature of the service request. However, in the service delivery platform, the MSC is programmed to provide the pre-specified message to SN 2110 instead of to the SCF. Logic operating in SN 2110 then processes the message, much as the SCF normally would, and returns a completion code to the MSC indicating that it may now proceed to process the voice call request. SN 2110 thus learns information about services on the circuit-switched network that UE 2180 invokes, e.g., the phone numbers of the calling and called parties, and the nature of the service, and also can authorize or even modify the service request when it returns the completion code to the MSC on CS network 120. Thus, SN 2110 looks like an SCF to the MSC. SN 2110 provides a control path to the CS network, but not a bearer path.

In the IMS core 2130, the S-CSCF normally communicates with "third party" ASs in order to provide services to UE 2180. Specifically, if an AS wants to communicate with UE 2180, it sends a request to the S-CSCF which triggers a Service Point Trigger (SPT) in the S-CSCF. The SPT are analogous to the TDP of the MSC in the CS network 2120, with some differences, as described in greater detail above. The SPT causes the S-CSCF to communicate appropriately with the UE 2180. If UE 2180 wants to communicate with an AS, i.e., to receive a service, it sends a SIP message to the S-CSCF, which triggers an SPT that instructs the S-CSCF to contact an AS to provide that service. In the described service delivery platform, SN 2110 operates much like an AS, and indeed looks like an AS to the IMS core 2130. When SN 2110 wants to contact UE 2180, it sends a transaction request to the S-CSCF, where it generates an SPT for the S-CSCF to forward the request to the UE. If UE 2180 wants to contact the SN 2110, it sends a SIP invite message to the S-CSCF, which generates an SPT for the S-CSCF to send the request to SN 2110. The SN 2110 then uses service logic to execute that request. Thus, in order to inter-work IMS 2130 and SN 2110, the S-CSCF simply needs to be configured to recognize the SN 2110 as an AS. This allows SN 2110 to learn about the packet-based connections that the UE and/or AS make with the S-CSCF. SN 2110 provides both control and bearer connectivity to the IMS core 2130 and external endpoints. Methods of interaction between SN 2110 and the IMS core 2130 are discussed in greater detail in U.S. Patent Pub. No. 2006/0291488, the entire contents of which are incorporated herein by reference.

To readily communicate with CS network 2120 and IMS core 2130, SN 2110 supports protocols for CS communications, e.g., SS7, and protocols for PS/IMS communications e.g., IP. For example, if SN 2110 is exchanging a message with PA 2185 in circuit-switched mode, it may use DTAP and if SN is exchanging a message with PA 2185 in packet-switched mode, it uses SIP. DTAP (Direct Transfer Application Part) is a protocol that carries messages between the handset and a switch and which is not interpreted by the intervening radio access network. Other protocols, such USSD (Unstructured Supplementary Services Data) can also be used. The protocol the service delivery platform, i.e., SN 2110 and PA 2185, uses depends on which network is more appropriate for the message.

In general, the triggering mechanisms such as TDP and SPT are examples of mechanisms that can be used to transfer information from the CS network 2120 and the IMS core 2130 to SN 2110; any mechanism that allows SN 2110 to learn sufficient information about the UE's connections to the two networks can be used. One example is Unstructured Supplementary Services Data (USSD).

In addition to signaling traffic, SN 2110 can also receive media traffic from content source(s) 2140, e.g., camcorders or digital cameras, and content server(s) 2150 that are capable of providing multimedia content 2160. This functionality is described in greater detail below.

Serving Node Component of Service Delivery Platform

As described above, SN 2110 communicates with CS network 2120 and IMS core 2130. As illustrated in FIG. 4, SN 2110 includes Load Balancer/Admission Control 2221, which includes a series of load balancing functions that handle incoming signals from CS network 2120 and IMS core 2130. Load Balancer/Admission Control 2221 then passes the signals to Signaling Adaptation Layer (SAL) 2222, which aggregates the signals into a common internal form.

Call Leg Manager (CLM) 2223 then logically processes the aggregated signals. As will be readily apparent to skilled practitioners in the art, call models used to describe telephone connections often split call states in one or more "call legs." In combinational services since both a voice call and a packet connection may exist contemporaneously the various call legs are integrated into a single logical session by another function called the General Call Session Manager (GCCM) 2232. Control of call legs is discussed in greater detail in U.S. Patent Pub. No. 2006/0291488, the entire contents of which are incorporated herein by reference.

In addition to signaling traffic, SN 2110 can also receive media traffic from content servers 2250, such as camcorders, external cameras, or proxies for same. A logical function called the Media Leg Manager (MLM) 2240 handles this media traffic, using protocols such as RTP, IP, and/or RTSP. Media traffic may also be re-directed by SN 2110 under roaming scenarios, as described in greater detail in U.S. Patent Pub. No. 2006/0291412, the entire contents of which are incorporated herein by reference. Various media servers and content servers will be not necessarily be aware of SN 2110; rather, SN 2110 may act as a proxy and retrieve content and media from such servers, then process it and transmit it to mobile handsets. In order to carry out these functions, SN 2110 supports various proxy functions.

Figure 6:
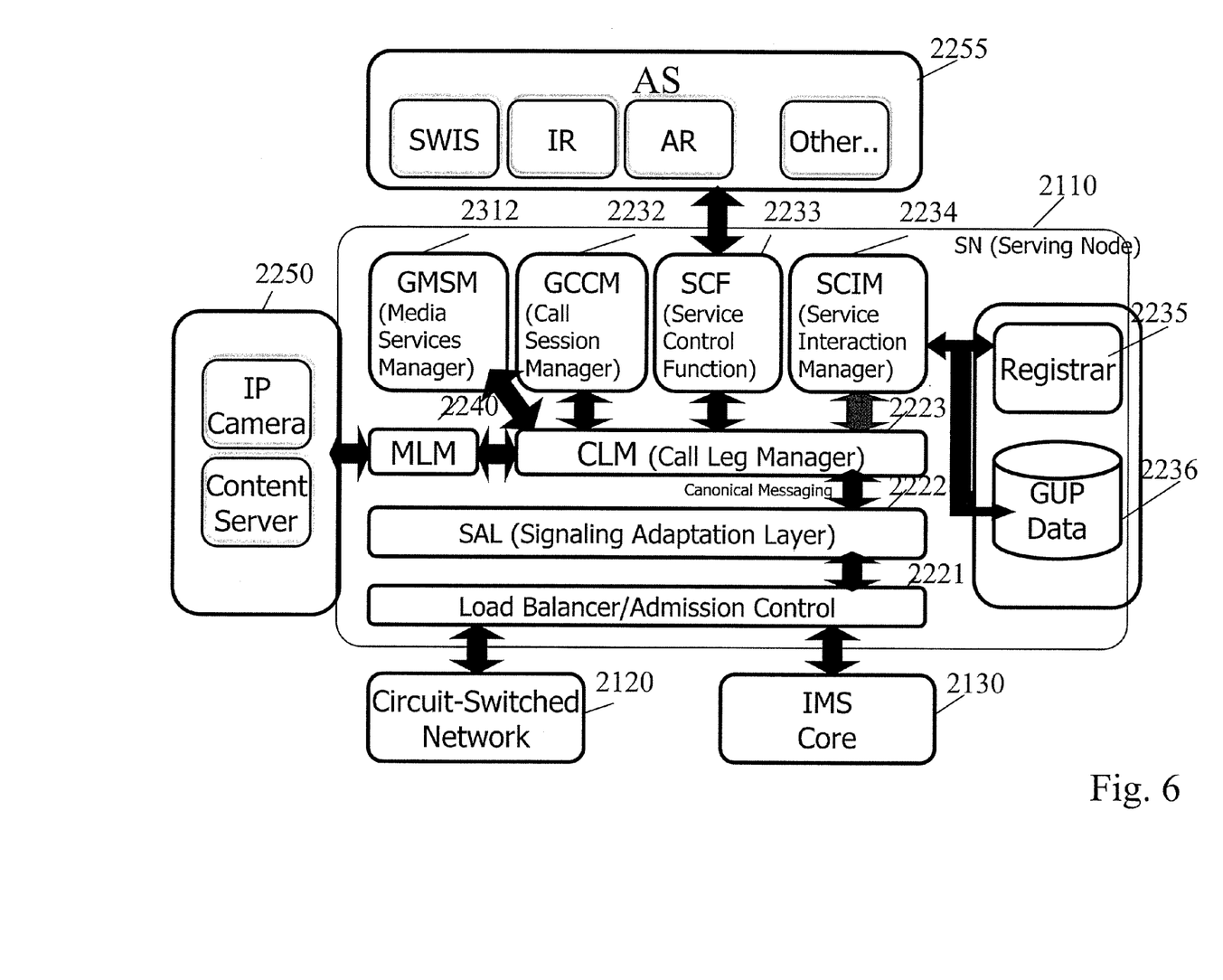
FIG. 6 illustrates the logical components of the serving node (SN) component of the service delivery platform (SDP)

SN 2110 supports a variety of combinational services, some examples of which are described below, and also provides an interface for supporting $3_{rd}$ party Application Servers (AS) 2255 (see, e.g., FIG. 6). These services, as stated earlier, generally involve contemporaneous circuit-switched and packet-switched connections. Some examples of such services as "See What I See" (SWIS) one "Image Ring" (IR) and "Ad Ring" (AR). The architecture of SN 2110 includes SCF 2233 and Registrar 2235 components cooperatively to make such services possible. In those cases where an external media service is needed, the proxy components of SN 2110 may be used to receive the external media, process it internally for use in mobile handsets, and then transmit the media to the handsets. Under roaming situations, SN may also use its mobility management components as described in greater detail in U.S. Patent Pub. No. 2006/0291412, the entire contents of which are incorporated herein by reference, to ensure that a favorable network connection is used to deliver the media to the roaming mobile handset. In particular, services from the circuit-switched and packet-switched networks may be combined in various temporal sequences and modalities. SN 2110 contains a Service Control Interaction Manager (SCIM) 234 component that uses policy driven service logic to resolve feature interactions when services are combined from different or the same networks are combined in various ways.

For security, privacy, management and efficiency reasons, the PS logic only responds to messages from SN. And since it is only the SN that is aware of both the PS and CS connections and impending and ongoing call state information, the SN is useful in delivering and coordinating the advertisements. The PA logic provides flexibility in which advertisements are shown when to the recipient. However, it is possible to envision a system in which the PA logic is not used to provide such flexibility. In this embodiment, a fixed rendering mechanism may be used (e.g., provided by the handset manufacturer) in the handset that employs a single algorithm to render the advertisements. This algorithm may be updated by sending an SMS message to the recipient handset. The user is then required to "click" on the received SMS message that causes a new algorithm to be loaded from the SN on to the handset.

Personal Agent Component of the Service Delivery Platform

Figure 7:
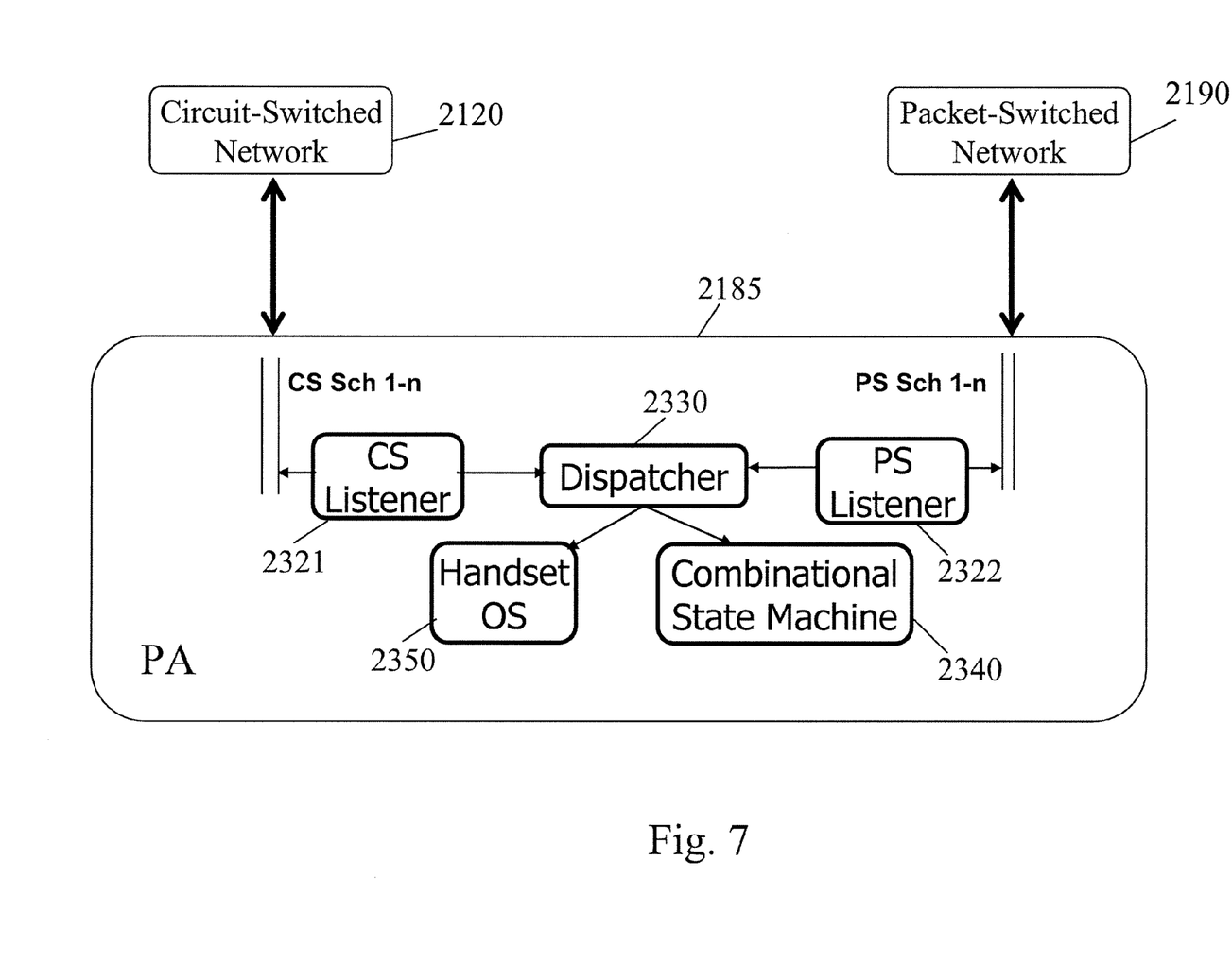
FIG. 7 illustrates the logical components of the personal agent (PA) component of the service delivery platform (SDP).

A special piece of service logic installed in a user's handset is referred to as the Personal Agent (PA). The basic architecture of PA 2185 assumes that the handset supports connections to both the circuit-switched (CS) network 2120 and the packet-switched (PS) network 2190, which are described in greater detail above. Generally, some handsets simultaneously support connections to both networks, and other handsets support a connection to only one network at a time. Here, the handset is assumed to support a number of CS signaling channels (CS Sch 1-$n$), and also a number of PS signaling channels (PS Sch 1-$n$). Thus, when a network entity such as SN 2110 sends a message to PA 2185 via CS network 2120 or PS network 2190, the message arrives at the corresponding signaling channel (CS Sch 1-$n$ or PS Sch 1-$n$).

As illustrated in FIG. 7, the PA includes CS "Listener" 2321 and PS "Listener" 2322, which receive messages on the signaling channels (CS Sch 1-$n$) and (PS Sch 1-$n$), respectively. CS Listener 2321 and PS Listener 2322 direct these messages to another service logic component called the "Dispatcher" 2330. Dispatcher 2330 uses internal logic to direct the messages appropriately either to the handset's operating system (OS) 2350 or to the Combinational State Machine 2340. Combinational State Machine 2340 handles the message according to its service logic. The actions of the combinational state machine are specific to the service that is being implemented.

As an illustrative example, consider a combinational service in which party A wishes to transmit a picture to party B while making a circuit-switched switched voice call to party B. Further assume that the underlying wireless network does not support multiple radio access bearers (mRAB). Thus, both handsets already share a CS connection, and not a PS connection. In such a case, the PA in the handset of party A sends a message e.g., using a USSD message, to the PA in the handset of party B via CS network 2120 and SN 2110. The message includes instructions to end the CS voice call; initiate a PS connection to receive the picture; and to end the PS connection.

The appropriate Listener in party B's handset receives the message and transmits it to the Dispatcher, which then sends it to the Combinational State Machine. The Combinational State Machine in party B's handset then interprets the message, terminates the CS voice call, initiates a PS connection to receive the picture and, after receiving the picture, terminates the PS connection. Then, the Combinational State Machine in party A's handset initiates a new CS voice call to party B's handset, and the parties can continue talking.

Some other illustrative examples of combinational services that the service delivery platform provides will now be described.

Because the service delivery platform has knowledge of both the CS and PS networks, the platform could be said to be aware of the circuit and packet components of combinational services. Specifically, the SN and the PA can be used together to synchronize a packet-switched connection with a circuit-switched connection in the user's handset, even if the handset itself cannot simultaneously support both kinds of connections.

Rendering Multimedia Objects on a (Single) Handset

An abstract (functional) model will now be presented that will explain how media can be rendered on a single handset. The functional entities we will describe include a Media Player (MP) which is responsible for interpreting objects such as video clips, (streaming) real time video, audio clips, etc., that may use different encoding formats such as MPEG4; a functional entity called the Renderer that accepts as input a symbolic description of the object from the MP and is responsible for rendering the object on the A/V output of the handset. Generally, handsets contain service logic that allows MP to access multimedia objects stored in the memory of the handset. In certain embodiments, the MP is encapsulated within an application. Handsets also typically contain service logic that takes the output of the Renderer and uses it to re-fresh the A/V outputs. Typically, the video output of the Renderer is referred to as a Screen Buffer (SB), which is used to create the output for the display of the handset. In certain embodiments there may be a plurality of screen buffers and other data-holding constructs that are used by the service logic to re-fresh the display or feed the audio out put devices of a handset. We shall collectively refer to such constructs and buffers as a screen buffer.

MP accesses the contents of the stored media for a selected object, retrieves said object, and interprets said object in terms specified by the Renderer interface. For example, consider a video clip stored in the memory of the handset. MP accesses this video clip, interprets the format of the clip, e.g., MPEG4, and creates a representation of the clip for processing by the Renderer. The Renderer accepts the representation from MP, processes it and creates a screen buffer. Service logic in the handset then reads the screen buffer and renders the video component on the display of the handset and the audio component on the speaker of the handset. Note that the Renderer is aware of the local hardware environment, e.g., size of the handset display, in order to create an appropriately sized screen buffer. Note also that the screen buffer is refreshed by the Renderer as new information becomes available at an appropriate rate. If we now consider a different video clip, say in MPEG2 format, again MP interprets the MPEG2 format and creates a representation of the clip that is then interpreted by the Renderer. Thus, the Renderer is not, in general, familiar with the different formats and encodings of the multimedia objects. Instead, it relies on an internal representation (format) into which media players translate all objects that need to be rendered. Thus, one of the Renderer's main functions is to create and maintain the screen buffer, e.g., the data structures and logical devices needed by the A/V system of the handset.

Rendering Multimedia Objects Contemporaneously on Two Handsets

If we now consider two different handsets, say A and B, then the afore-mentioned abstract model applies to both handsets. In some embodiments, in order to render the same object on both handsets, a copy of that object exists in the memory of both handsets and is contemporaneously rendered using the model described above. Using this model, if only handset A initially had a copy of the object, it would need to transmit the object, e.g., the video clip from the example above, from one handset, say A, to the handset B. While such a copying operation may violate digital rights associated some particular objects, many objects do not have digital rights that would be violated by such a use. For example, if A had recorded and stored a personal video in memory and wished to share that video with B, it would not violate any party's rights for A to share the video with B. Digital copy protection procedures such as those well known in the art, e.g., DRM, could be used to regulate the copying and contemporaneous rendering of objects protected by digital rights, but allow the copying and contemporaneous rendering of unprotected objects. Alternately, for DRM-protected objects, the objects can be shared without copying them using the methods described in greater detail below in the section entitled "Contemporaneous Rendering Without Violating Digital Rights."

An embodiment of a system that can facilitate the contemporaneous rendering of multimedia objects on two handsets is the Service Delivery Platform (SDP), described in detail in U.S. Pat. Pub. No. 2007/0197227. Descriptions of other systems and/or components may be found in the incorporated patent references, given below.

Transmitting selected digital objects (or portions of digital objects) is a fundamental capability of the SDP. In particular, the PA (service logic resident in the handset) aids in the selection of an object, creates a "network path" from the handset "A" to the SN from whence a second "network path" is created to the receiving handset. Contents of the selected object are transmitted along these two paths, via the SN. The setting up of the network paths is preceded by control information ("signaling") that aids in setting up the paths and the transmittal of the selected object is typically referred to as "bearer" traffic. The two network paths are more typically referred to as "call legs." Embodiments of appropriate signaling protocols between the handsets and network entities is described in greater detail in U.S. Pat. Pub. No. 2007/0197227, attached as Appendix A, as well as in U.S. patent application Ser. No. 11/709,469, filed Feb. 22, 2007 and entitled "System and Methods for Enabling IP Signaling in Wireless Networks."

It is important to distinguish between the PA service logic that is used in conjunction with the SN and the service logic that is used by the handset to re-fresh the display etc. of the handset. We shall refer to the latter as the native service logic of the handset when there is danger of ambiguity.

Once the transmission of the selected object from handset "A" has finished and a copy of said object exists on handset "B", the rendering of the selected object may begin at both handsets independently, e.g., using the model described above. In some implementations it is not necessary for the entire copy of the selected object to exist on the handset "B" before rendering can be initiated. Rather, a fraction, i.e., a portion, of the said object is enough to start the rendering operation. This is typically referred to as "streaming."

As the two renderings of the selected object proceed independently on the two handsets, there may be a need to coordinate the pace of the renderings. An approximate coordination may be achieved by exchanging control information on the signaling channel that exists on the two call legs. RTCP is an exemplary protocol that can be used, and other more timely constructs may be used as can other mechanisms that may be developed for this specific purpose.

Figure 1:
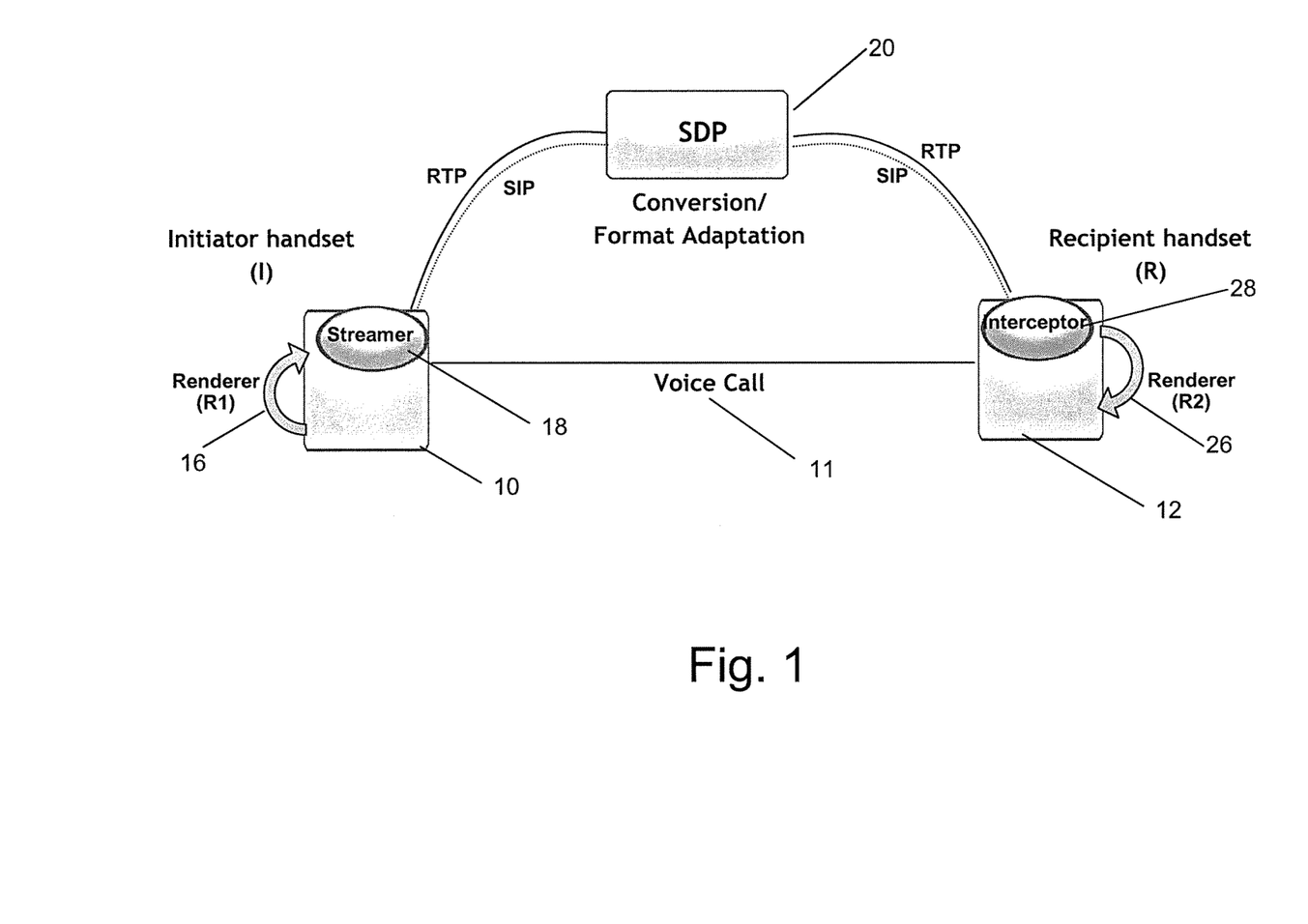
FIG. 1 illustrates an architecture allowing using a recipient handset as a remote screen for the initiator handset according to one embodiment of the invention.

The architecture used for rendering multimedia objects contemporaneously on two handsets is illustrated in FIG. 1. Initiator handset (I) 10 makes a voice call 11 to recipient handset (R) 12. Initiator handset 10 exchanges options with recipient handset 12 via the SDP 20 to assess if recipient handset 12 is capable of the service. SDP 20 gets indication from recipient handset 12, and notifies initiator handset 10 (e.g., with a "green" indicator) conveying that recipient handset 21 is capable of service. Streamer 18 in initiator handset 10 takes the output from the initiator handset's renderer (R1) 16 and sends it to the SDP 20. SDP 20 adapts the format to a format conducive to the recipient handset 12. Interceptor 28 in recipient handset 12 takes the information coming from SDP 20, and passes it to the recipient handset's renderer (R2) 26. Renderer 26 displays on the screen of the recipient handset 12 what renderer (R1) 16 is displaying at the initiator handset 10.

Figure 2:
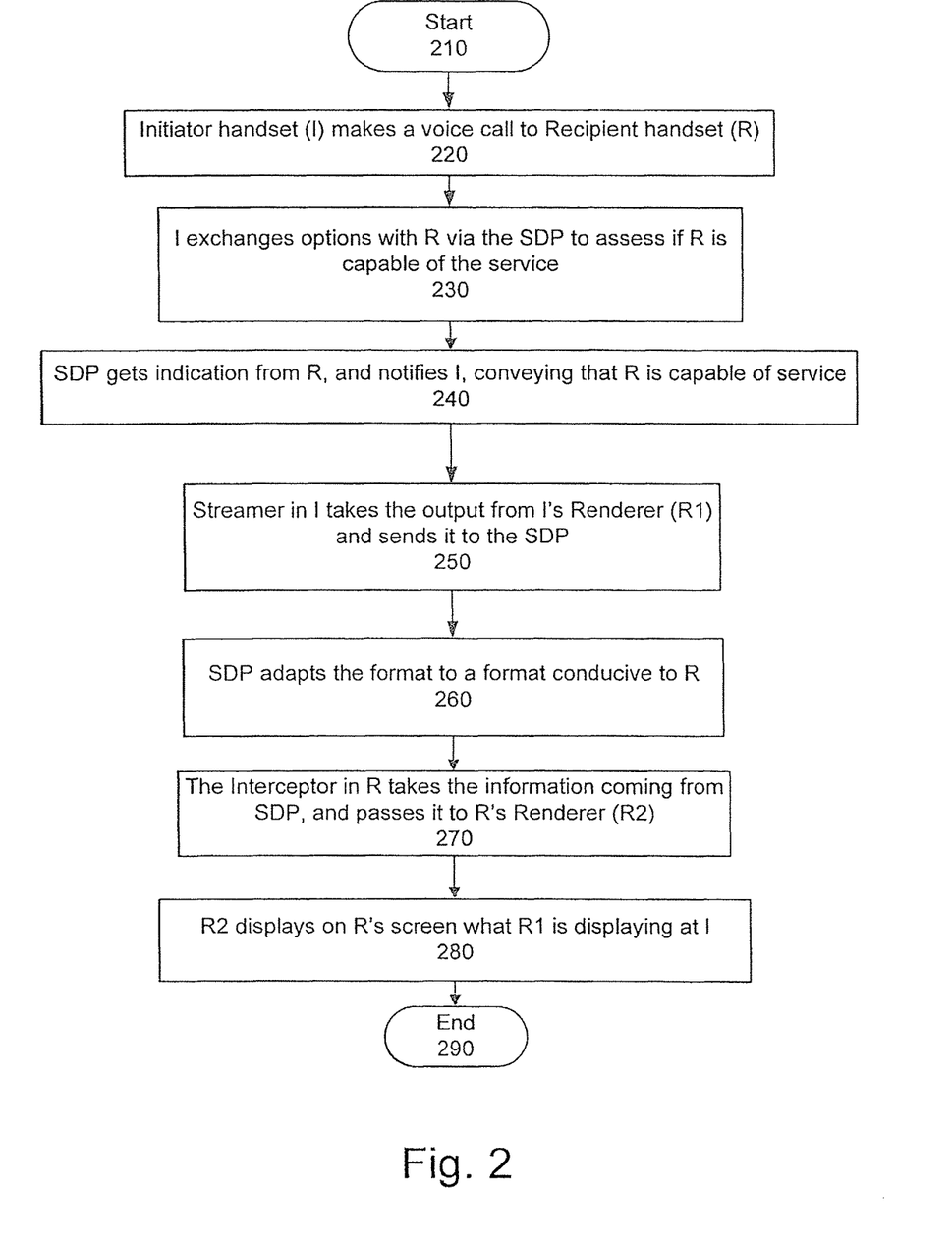
FIG. 2 is an exemplary flowchart according to one embodiment of the invention.

An exemplary sequence of steps using the architecture of FIG. 1 is illustrated below (this sequence is also illustrated in FIG. 2):

1. Initiator handset (I) makes a voice call to recipient handset (R);
2. Initiator handset exchanges options with recipient handset via the SDP to assess if recipient handset is capable of the service;
3. SDP gets indication from recipient handset, and notifies initiator handset (e.g., with a "green" indicator) conveying that recipient handset is capable of the service;
4. Streamer in initiator handset takes the output from the initiator handset's renderer (R1) and sends it to the SDP;
5. SDP adapts the format to a format conducive to the recipient handset;
6. Interceptor in recipient handset takes the information coming from SDP, and passes it to the recipient handset's renderer (R2);
7. Recipient handset's renderer (R2) displays on the screen of the recipient handset what renderer (R1) is displaying at the initiator handset 10.

It should be noted that step (5) is optional as adaptation of the format by the SDP may not be necessary (e.g., when the recipient and the initiator handsets are the same handset model).

Contemporaneous Rendering without Violating Digital Rights

Other embodiments of the systems and methods provide contemporaneous rendering without the possibility of violating digital rights that may be associated with that object, by avoiding copying the object selected for contemporaneous rendering. Instead, these embodiments rely on the real-time capture of the screen buffer that is used by the native service logic resident in the handset to re-fresh the display and feed the audio out devices of the handset.

In particular, PA service logic in the first handset intervenes in the internal processing of the screen buffer, which is described in greater detail above, and encapsulates the contents of the screen buffer using an internal protocol (e.g., RTP). This encapsulated information is then transmitted to the second handset, received by PA service logic resident in the second handset, de-encapsulated, and inserted into the screen buffer of the second handset from whence native service logic of the handset uses the newly inserted information to re-fresh the display. One exemplary embodiment of the contemporaneous rendering of the multimedia objects is as follows. It is assumed in this exemplary embodiment that the two consumers engage in sharing a music video, i.e., the media sharing service allows a music video to be contemporaneously rendered on the two handsets. An exemplary sequence is as follows:

1. Consumer A initiates phone call to consumer B;
2. PA logic resident in handset A, denoted as PA(A), is activated by the originating call event (most handset OS support native APIs that provide such event notifications);
3. PA(A) engages in capability exchange with PA(B) via SN to establish signaling and bearer paths for possible combinational service use;
4. Consumer A initiates media sharing service, for example by entering an appropriate command at handset A and selects the music video to be shared with consumer B;
5. PA(A) registers that selected media is DRM protected and initiates DRM-protection mode for sharing service;
6. PA(A) intervenes in internal rendering process of handset A and reads screen buffer periodically at a pre-determined and programmed rate;

7. PA(A) encapsulates screen buffer information into a suitable format for transmittal to handset B via SN;
8. Whilst PA(A) is engaged as described above and below, native service logic of handset A, working in parallel with service logic PA(A), uses the contents of screen buffer to re-fresh the display of the handset A and to direct audio of the music video to the suitable audio out components of the handset, i.e., the rendering of the music video on handset A begins under control of the native service logic;
9. PA(A) initiates said transmittal;
10. PA(B) receives said transmission, de-encapsulates received information and stores it into the screen buffer of handset B; and
11. The above process of reading the screen buffer of handset A, encapsulating and transmitting to B, and de-encapsulating and storing it into the screen buffer of B, is repeated at the pre-determined periodic rate until the sharing service is active.

It should be noted in the example above that the process of capturing and transmitting the screen buffer from the first handset (A) and its subsequent rendering on handset B allows the same video data to be displayed contemporaneously on both handsets, A and B. In some embodiments, the audio output of the music video is provided as input to the audio out of handset A and is then carried as a part of the "voice connection" on the CS connection that co-exists with the PS connection in the underlying combinational service. Thus, in this embodiment, the PS connection carries the video information and the CS connection carries the audio out of the music video mixed in with the voice conversation (if any) between the two parties. Thus, the audio portion of a media sharing service can be shared by using the CS connection to carry the audio and mixing it with the ongoing voice conversation. In other embodiments, the audio is carried on a PS connection, e.g., the connection that also transmits the video information. For example, the audio portion can be encapsulated in RTP and transmitted using IP transport over the PS connection. Note, however, that in this embodiment the bandwidth of the PS connection would be dominated by the video information, thus potentially reducing the quality of the audio concurrently transmitted using that connection.

The particular signaling protocols that can be used at each step for communication between the handsets and the network entities are described in greater detail in U.S. Patent Pub. No. 2007/0197227 and U.S. patent application Ser. No. 11/709,469, filed Feb. 22, 2007, the entire disclosures of which are incorporated herein by reference.

As mentioned above native service logic in handsets A and B are aware of the local physical environment of their respective handsets; thus, in certain cases when the screen buffer of A is transmitted to B, the transmitted information may be insufficient or inadequate to satisfy the needs of the native service logic in B. For example, if handset A has a display of size CIF and the handset B has a size of QCIF, that would result in a size mismatch between the two displays. In such a case the capability exchange in step 3 of the exemplary process flow above can be used by PA(A) and PA(B) to negotiate up-front the differences between the size of the displays and other such potential disparities. These negotiations can then used by the handsets' respective PA service logic to rectify the disparity and provide remedy to the situation at hand. For example, in certain cases this may result in PA(B) using only a portion of the display of the handset B.

It should be noted that in this embodiment, no copy is made of the content being shared by two handsets engaged in contemporaneous rendering and no copies are ever created, stored or left behind at the conclusion of the sharing service, except for the original source copy at the originating handset. The only information that is transmitted from one party to the other is the rendering information from one handset to the second handset. In a simple example, it is akin to using an extra set of external speakers and/or an external display for a content file, albeit in this case the set of extra external speakers are connected to the first (source) handset via a wireless connection.

As a further exemplary sharing service, the above described embodiment can be used to instruct consumers in the use of their handsets by customer service agents. In particular, a customer needing help with the working of their (first) handset may call a customer service agent who using a similar (second) handset starts a sharing service with the first handset. Said customer service agent then executes actions on the second handset, e.g., traversing certain menus and displaying certain menu items and entering data on second handset. These actions are visible and discernible to the consumer who sees the actions being undertaken by the agent because of the sharing service. In particular whatever actions the agent undertakes on the second handset are rendered on the first handset and hence visible to the consumer. In this manner the agent may instruct the consumer via use of the present invention.

Another exemplary sharing service is provided by the case when a consumer (A) wishes to show an email to another consumer (B) but does not wish to send a copy of the email to consumer B. By initiating the media sharing service on his phone and then displaying said email on his phone, consumer A can share email contents with consumer B without fear that consumer B will obtain a copy of said email.

The above embodiments have been described in terms of two handsets sharing a multimedia object. However, practitioners skilled in the art will appreciate that the described embodiments can readily be extended to allow a plurality of recipients to share a multimedia object or service originated from a source handset. In one embodiment, this can be accomplished by providing a single uplink from originating handset to the SN, and a multiplicity of downlink PS connections to multiple receiving handsets.

Embodiments of the present invention build on techniques, systems and methods disclosed in earlier filed applications, referred to herein as the "incorporated patent references," including but not limited to the following references, the entire contents of which are incorporated herein by reference:

U.S. Patent Pub. No. 2007/0197227, entitled System and Method for Enabling Combinational Services in Wireless Networks By Using a Service Delivery Platform; U.S. Patent Pub. No. 2006/0291437, entitled System and Method to Provide Dynamic Call Models for Users in an IMS Network; U.S. Patent Pub. No. US 2007/0008913, entitled Method and System for Provisioning IMS Networks with Virtual Service Organizations Having Distinct Service Logic; U.S. Patent Pub. No. US 2006/0291484, entitled Method of Avoiding or Minimizing Cost of Stateful Connections Between Application Servers and S-CSCF Nodes in an IMS Network with Multiple Domains; U.S. Patent Pub. No. 2007/0008951, entitled Mediation System and Method for Hybrid Network Including an IMS Network; U.S. Patent Pub. No. 2006/0291412, entitled Associated Device Discovery in IMS Networks; U.S. Patent Pub. No. 2006/0291487, entitled IMS Networks with A VS Sessions with Multiple Access Networks; U.S. Patent Pub. No. 2006/0291488, entitled System and Method of Interworking Non-IMS and IMS Networks to Create New Services Utilizing Both Networks; U.S. Patent Pub. No. 2006/0291489, entitled System and Method to Mediate Delivery of Legacy, Non-IMS Services into an IMS Network; U.S. Patent Pub. No. 2006/0294244, entitled Digital Home Networks Having a Control Point Located on a Wide Area Network; U.S. patent application Ser. No. 11/709,469, filed Feb. 22, 2007, entitled System and Methods for IP Signaling in Wireless Networks; and U.S. patent application Ser. No. 11/787,635, filed Apr. 17, 2007, entitled Systems and Methods for IMS User Sessions with Dynamic Service Selection.

It will be further appreciated that the scope of the present invention is not limited to the above-described embodiments, and that the invention encompasses modifications of and improvements to what has been described.

What is claimed is:

1. A method for utilizing a recipient handset as a remote screen for a initiator handset during a combinational service between the recipient and initiator handsets, wherein both the recipient and initiator handsets are on a wireless network utilizing multiple Radio Access Bearer (mRAB) technology, supporting both a circuit switched (CS) network and a packet switched (PS) network, wherein the combinational service comprises a voice call and a multimedia object, wherein the multimedia object comprises both audio and video data, the method comprising:
    during a voice call between the initiator handset and the recipient handset, over a circuit switched (CS) network, personal agent (PA) logic stored in memory on the initiator handset directing an audio stream to the recipient handset using the CS network, wherein the audio stream comprises a mixing of a first audio portion from the voice call and a second audio portion corresponding to the audio data in the multimedia object; and
    PA logic in the initiator handset directing the video data from the multimedia object via a packet switched (PS) network,
    wherein providing only the video data on the PS network prevents the recipient handset from making a full copy of the multimedia object, wherein the full copy includes both the audio and the video data.

2. The method of claim 1, further comprising receiving from a Serving Node (SN) a multimedia object previously converted by the SN prior to forwarding the multimedia object to the recipient handset.

3. The method of claim 1, wherein rendering of the multimedia object is initiated on the recipient handset before the entire multimedia object has been received.

4. The method of claim 3, wherein the rendering of the multimedia object on the recipient handset is coordinated, through a Serving Node (SN), with the rendering on the initiator handset.

5. The method of claim 1, wherein the PA logic on the initiator handset captures the multimedia object and sends it to the Serving Node (SN) at a predetermined rate.

6. The method of claim 1, wherein the multimedia object comprises a representation of a media object residing on the initiator handset.

7. The method of claim 6, wherein the multimedia object comprises a video clip, a digital image, a SMS, a MMS, and IM message or an E-mail message.

8. A method for utilizing a recipient handset as a remote screen for a initiator handset during a combinational service between the recipient and initiator handsets, wherein both the recipient and initiator handsets are on a wireless network utilizing a singe Radio Access Bearer technology, supporting only one of a circuit switched (CS) network and a packet switched (PS) network at any given time, wherein the combinational service comprises a voice call and a multimedia object, wherein the multimedia object comprises both audio and video data, the method comprising:
    during a voice call between the initiator handset and the recipient handset, over a circuit switched (CS) network, personal agent (PA) logic in the initiator handset migrating the voice call to the recipient handset from the CS network to the PS network to create a PS session; and
    PA logic in the initiator handset mixing the multimedia object with the voice call on the PS session for delivery to the recipient handset;
    wherein providing both the voice and the multimedia object on the PS network prevents the recipient handset from making a full, correct copy of the multimedia object, wherein the full, correct copy includes only the audio and the video data from the multimedia object and not audio from the voice call.

9. The method of claim 8, further comprising receiving from a Serving Node (SN) a multimedia object previously converted by the SN prior to delivering the multimedia object to the recipient handset.

10. The method of claim 8, wherein the mixing of the multimedia object is initiated on the recipient handset before the entire multimedia object has been received.

11. The method of claim 8, wherein rendering of the multimedia object on the recipient handset is coordinated, through a Serving Node, with rendering on the initiator handset.

12. The method of claim 8, wherein the PA logic on the initiator handset sends the mixed voice and multimedia object to a Serving Node at a predetermined rate.

13. The method of claim 8, wherein the multimedia object comprises a representation of a media object residing on the initiator handset.

14. The method of claim 13, wherein the multimedia object comprises a video clip, a digital image, a SMS, a MMS, an 1M message or an E-mail message.

* * * * *